United States Patent
Ueki et al.

(10) Patent No.: US 9,595,745 B2
(45) Date of Patent: Mar. 14, 2017

(54) NONAQUEOUS ELECTROLYTE SECONDARY BATTERY

(75) Inventors: Tomoyoshi Ueki, Toyota (JP);
Harunari Shimamura, Moriguchi (JP);
Yusuke Fukumoto, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/234,697

(22) PCT Filed: Jul. 25, 2011

(86) PCT No.: PCT/JP2011/066873
§ 371 (c)(1),
(2), (4) Date: Jan. 24, 2014

(87) PCT Pub. No.: WO2013/014742
PCT Pub. Date: Jan. 31, 2013

(65) Prior Publication Data
US 2014/0154583 A1    Jun. 5, 2014

(51) Int. Cl.
*H01M 2/18*    (2006.01)
*H01M 10/658*  (2014.01)
*H01M 2/16*    (2006.01)
*H01M 10/052*  (2010.01)

(52) U.S. Cl.
CPC ..... *H01M 10/5087* (2013.01); *H01M 2/1666* (2013.01); *H01M 2/1673* (2013.01); *H01M 10/052* (2013.01); *Y02T 10/7011* (2013.01)

(58) Field of Classification Search
CPC ........... H01M 10/5087; H01M 2/1673; H01M 2/1666; H01M 10/052; Y02T 10/7011
See application file for complete search history.

(56) References Cited

U.S. PATENT DOCUMENTS

| | | |
|---|---|---|
| 2006/0051663 A1 | 3/2006 | Fujita et al. |
| 2007/0122116 A1 | 5/2007 | Seo et al. |
| 2007/0122716 A1* | 5/2007 | Seo ............... H01M 2/1646 429/251 |
| 2009/0246613 A1 | 10/2009 | Park et al. |

(Continued)

FOREIGN PATENT DOCUMENTS

| | | |
|---|---|---|
| CN | 1728439 | 2/2006 |
| JP | 2008-300362 | 12/2008 |

(Continued)

OTHER PUBLICATIONS

Machine translation of JP 2010-160985, retrieved from <https://www.j-platpat.inpit.go.jp/web/all/top/BTmTopEnglishPage> on May 28, 2015.*

*Primary Examiner* — Cynthia K Walls
(74) *Attorney, Agent, or Firm* — Finnegan, Henderson, Farabow, Garrett & Dunner, LLP

(57) ABSTRACT

A nonaqueous electrolyte secondary battery 100 according to this invention includes a positive electrode 10, a negative electrode 20, a separator 40 interposed between the positive electrode 10 and the negative electrode 20, and a nonaqueous electrolyte solution. A porous heat-resistant layer 42 is additionally provided between the separator 40 and at least one electrode from among the positive electrode 10 and the negative electrode 20. The porous heat-resistant layer 42 includes hollow particles 44 made of an inorganic material, and a binder 46.

4 Claims, 7 Drawing Sheets

(56) References Cited

U.S. PATENT DOCUMENTS

2010/0068612 A1 3/2010 Nishikawa

FOREIGN PATENT DOCUMENTS

| JP | 2009-517810 | 4/2009 |
| JP | 2009-143060 | 7/2009 |
| JP | 2010-520095 | 6/2010 |
| JP | 2010-160985 | 7/2010 |
| KR | 1020070055979 A | 5/2007 |
| WO | WO 2012/049748 A1 | 4/2012 |
| WO | WO 2012/124093 A1 | 9/2012 |

* cited by examiner

NONAQUEOUS ELECTROLYTE SECONDARY BATTERY

CROSS-REFERENCE TO RELATED APPLICATIONS

This application is a national phase application of International Application No. PCT/JP2011/066873, filed Jul. 25, 2011, the content of which is incorporated herein by reference.

TECHNICAL FIELD

The present invention relates to a nonaqueous electrolyte secondary battery, and more particularly, to a nonaqueous electrolyte secondary battery having a porous heat-resistant layer between an electrode and a separator.

BACKGROUND ART

In recent years, lithium secondary batteries, nickel hydrogen batteries and other secondary batteries (storage cells) have been growing in importance as on-board electric power sources for vehicles and electric power sources for personal computers and handheld devices. In particular, lithium secondary batteries, which are lightweight and can achieve a high energy density, are advantageously used as high-power on-board electric power sources. In a typical construction, this type of lithium secondary battery has a positive electrode, a negative electrode, and a porous separator between the positive electrode and the negative electrode. The separator prevents short circuits associated with contact between the positive electrode and the negative electrode. In addition, pores within the separator are impregnated with an electrolyte, thereby forming ion-conducting paths between both electrodes.

The separators used up until now have been porous resin sheets made of for example, polyethylene (PE) or polypropylene (PP). Because such separators are porous, heat shrinkage arises at elevated temperatures. This effect is used to actuate a shutdown function. However, if the degree of thermal shrinkage is large, localized shorting due to film breakage or the like may arise, and shorting may spread further from this point. Hence, to prevent heat shrinkage of the separator, the formation of a porous heat-resistant layer on the separator surface has been disclosed (see, for example, Patent Literature 1). The formation of a porous heat resistant layer at the surface of the positive electrode or the negative electrode in order to keep the positive electrode and the negative electrode from coming into direct contact when the separator undergoes heat shrinkage has also been investigated.

CITATION LIST

Patent Literature

Patent Literature 1: Japanese Patent Application Laid-open No. 2008-300362

SUMMARY OF INVENTION

There exists a desire that lithium secondary batteries intended for use as a power source in vehicles (e.g., lithium secondary batteries installed in hybrid vehicles which use lithium secondary batteries as a power source in combination with another power source having a different principle of operation—such as an internal combustion engine, or in electric automobiles) have a high power output as a source of electricity for driving the vehicle. In lithium secondary batteries in which a porous heat-resistant layer has been formed on the surface of the separator or an electrode, in order to achieve a high power, it is important for the ionic permeability to be high. To achieve a higher power, it is desirable for the porous heat-resistant layer to have a large porosity. Patent Literature 1 mentions that the porous heat-resistant layer has a porosity of from 40% to 60%.

However, simply making the porosity of the porous heat-resistant layer larger leads to a smaller surface area of contact between the porous heat-resistant layer and the separator or the electrode, as a result of which a sufficient adhesive strength between the porous heat-resistant layer and the separator or electrode is not obtained, which may lead to peeling of the porous heat-resistant layer from the separator or electrode.

Accordingly, the primary object of this invention, which was arrived at in light of the above, is to provide a nonaqueous electrolyte secondary battery equipped with a porous heat-resistant layer, which battery has excellent high-rate characteristics and a good durability.

The nonaqueous electrolyte secondary battery of the invention has a positive electrode, a negative electrode, a separator interposed between the positive electrode and the negative electrode, and a nonaqueous electrolyte solution (a nonaqueous electrolyte in the form of a liquid). The battery further includes a porous heat-resistant layer disposed between the separator and at least one electrode from among the positive electrode and the negative electrode. The porous heat-resistant layer includes hollow particles made of an inorganic material and also includes a binder. In a preferred embodiment, the porous heat-resistant layer containing the hollow particles is formed on at least one surface of the separator. The porous heat-resistant layer may be formed on a surface of at least one electrode from among the positive electrode and the negative electrode.

As used herein, "hollow particles" refers to particles having a hollow construction with a hollow portion (cavity) formed on the inside thereof. Such hollow particles typically have holes which open out onto a shell. In other words, the shell does not close off the hollow portion; instead, material transfer between the outside of the hollow particle and the interior is possible through these open holes.

Also, "porosity of the porous heat-resistant layer" refers to the ratio of the volume of the pores formed within the porous heat-resistant layer to the apparent volume of the porous heat-resistant layer. Here, the volume of the pores formed within the porous heat-resistant layer may include the volume of pores formed outside of the hollow particles (typically, the gaps between the particles) and the volume of pores formed within the hollow particles (typically, the hollow portion).

In this construction, because the porous heat-resistant layer includes hollow particles having a cavity at the particle interior, the porosity can be increased without enlarging the gaps between the hollow particles. Hence, compared with cases in which conventional solid particles are used, the ionic permeability of the porous heat-resistant layer can be increased while maintaining adhesion to the separator or electrode at about the same level. Therefore, with this invention, it is possible to provide a nonaqueous electrolyte secondary battery which has excellent high-rate characteristics (e.g., at least one of the following: suppression of a rise in resistance due to high-rate cycling like that in a high-rate cycling test, and an increase in the high-rate discharge performance), and which has a good durability because the porous heat-resistant layer does not readily peel off.

In a preferred embodiment of the nonaqueous electrolyte secondary battery disclosed here, the hollow particles have a hollowness of from 3% to 30%. This enables a nonaqueous electrolyte secondary battery which stably exhibits a higher performance to be constructed. If the hollowness is too small, the amount of liquid held in the hollow portion decreases, as a result of which the battery performance-enhancing effects associated with the use of hollow particles may be inadequate. On the other hand, if the hollowness is too large, the strength of the particles themselves tends to be insufficient, which may lead to structural collapse of the hollow particles owing to stresses incurred in the course of battery manufacture or to changes in the volume of the electrode active material layer that accompany charging and discharging of the battery, as a result of which the desired effects may not be achieved.

Here, the "hollowness" of a hollow particle refers to the ratio of the volume of the hollow portion to the apparent volume of the hollow particle. This can be determined by, for example, observing a particle cross-section (typically, the cross-section where the cross-sectional diameter of the particle is at its largest) with a scanning electron microscope (SEM), measuring from this cross-sectional SEM image the cross-sectional surface area of the overall particle (i.e., the cross-sectional surface area of the shell and the hollow portion) and the cross-sectional surface area of the hollow portion alone, then carrying out the calculation shown in formula (1) below.

$$\text{Hollowness (\%)} = (r^3/R^3) \times 100 \tag{1}$$

Here, R in above formula (1) is the radius of an ideal circle (true circle) having the same surface area as the cross-sectional surface area of the overall particle measured above, and r is the radius of an ideal circle (true circle) having the same surface area as the cross-sectional surface area of the hollow portion alone. That is, the hollowness of the hollow particles under measurement (typically a powder) can be determined by measuring the hollownesses calculated from formula (1) above for the individual hollow particles making up the powder. It is preferable to use as the hollowness the arithmetic mean of the results obtained by carrying out the above-described measurements on at least 20 to 30 hollow particles.

In a preferred embodiment of the nonaqueous electrolyte secondary battery disclosed here, the average particle diameter (meaning the median diameter (D50); the same applies below) of the hollow particles is from 0.5 µm to 1 µm. With such hollow particles, a good battery performance can be more stably exhibited. For example, if the average particle diameter is too much smaller than 0.5 µm, adjustment to the desired hollowness becomes difficult and variability in the hollowness increases, in addition to which the battery performance-enhancing effect associated with the use of hollow particles tends to decline. On the other hand, if the average particle diameter is too much larger than 1 µm, the particle strength tends to be inadequate and the crushing strength tends to decline. The average particle diameter of hollow particles can be determined by a known method, such as measurement based on a laser diffraction scattering method.

In another preferred embodiment of the nonaqueous electrolyte secondary battery disclosed here, the porous heat-resistant layer has a porosity of at least 45%. This enables a nonaqueous electrolyte secondary battery having even better high-rate characteristics to be constructed. In addition, because the hollow portions of the hollow particles contribute to the above numerical value of porosity, compared to a case in which the same degree of porosity has been achieved using conventional solid particles (that is, with only the gaps between particles as pores), the adhesion between the porous heat-resistant layer and the separator or electrode is good. As a result, a nonaqueous electrolyte secondary battery in which the porous heat-resistant layer does not readily peel from the separator or electrode and which thus has an excellent durability is obtained.

In yet another preferred embodiment of the nonaqueous electrolyte secondary battery disclosed here, the porous heat-resistant layer is formed on at least one side of the separator. This construction, owing to the shape retention strength of the porous heat-resistant layer, enables heat shrinkage by the separator to be effectively suppressed.

The material making up the hollow particles, although not particularly limited, may be at least one type of inorganic compound selected from the group consisting of alumina, magnesia, zirconia, silica, boehmite and titania. Because these inorganic compounds having an excellent heat resistance at elevated temperatures, they can be advantageously used as hollow particles suitable for the objects of this invention. These inorganic compounds are also suitable in that they can easily be rendered into hollow particles.

Owing to, for example, their excellent high-rate characteristics and good durability, any of the nonaqueous electrolyte secondary batteries disclosed herein are suitable as nonaqueous electrolyte secondary batteries (e.g., lithium secondary batteries) for use in vehicles such as automobiles. Therefore, this invention makes it possible to provide vehicles (e.g., automobiles) in which nonaqueous electrolyte secondary batteries (which may be in the form of a battery pack formed of a plurality of connected nonaqueous electrolyte secondary batteries) are installed as a source of power (typically, a source of power in a hybrid vehicle or an electric vehicle).

DESCRIPTION OF EMBODIMENTS

Embodiments of the invention are described below in conjunction with the attached diagrams, in which members or features having like functions are designated by like symbols. Dimensions (length, width, depth, etc.) in the respective drawings do not reflect actual dimensions. Note that technical matters which are required for carrying out the present invention but are not particularly mentioned in the present Description (e.g., methods of manufacturing positive electrode active materials and negative electrode active materials, the construction of and methods of manufacturing separators and electrolytes, the general art relating to the building of nonaqueous electrolyte secondary batteries and other batteries) are matters of design variation that could be apprehended by a person skilled in the art based on prior art.

Figure 1:
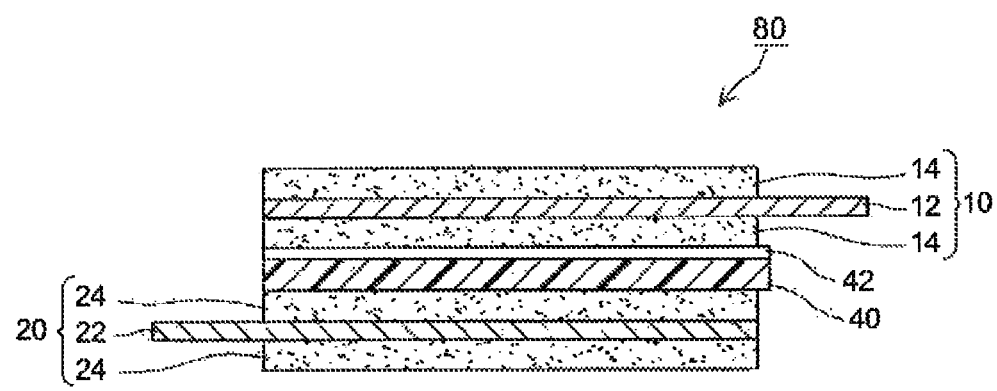
FIG. 1 is a cross-sectional diagram schematically showing the essential features of a coiled electrode assembly such as may be used in an embodiment of the invention.
Figure 2:
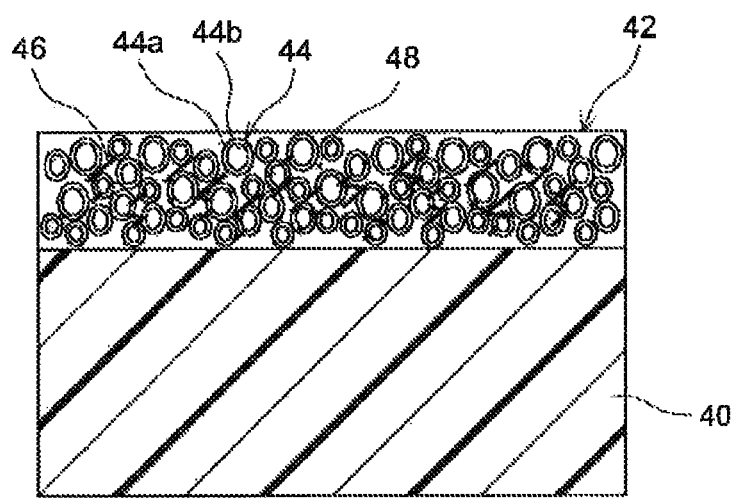
FIG. 2 is a cross-sectional diagram schematically showing a separator and a porous heat-resistant layer such as may be used in an embodiment of the invention.
Figure 3:
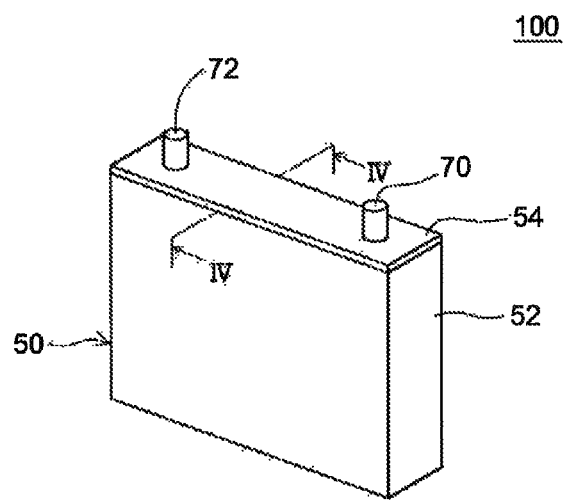
FIG. 3 is a perspective view schematically showing the appearance of a nonaqueous electrolyte secondary battery according to an embodiment of the invention.
Figure 4:
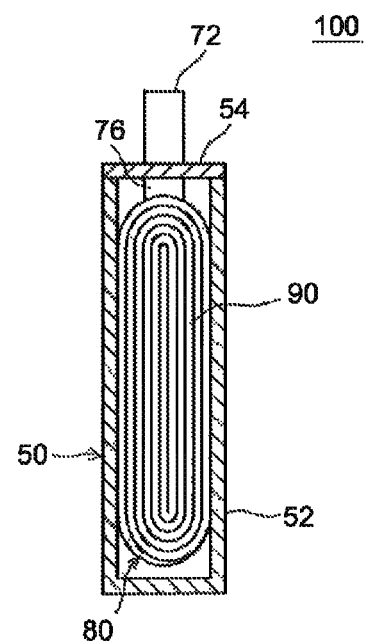
FIG. 4 is a diagram schematically showing a section taken along line IV-IV in FIG. 3.

Although not intended to be particularly limiting, an embodiment of the invention is described in detail below with reference to, by way of illustration, a lithium secondary battery (lithium ion secondary battery). Essential features of the lithium secondary battery according to this embodiment are shown in FIGS. 1 and 2. FIG. 1 is a schematic cross-sectional enlarged view showing part of the cross-section obtained by cutting a coiled electrode assembly 80 such as may be used in the lithium secondary battery in a radial direction (stacking direction of the positive and negative electrode sheets and the separator). FIG. 2 is a cross-sectional view schematically showing a separator 40 such as may be used in this embodiment and a porous heat-resistant layer 42 formed on the separator 40.

The lithium secondary battery according to this embodiment includes, as shown in FIG. 1, an electrode assembly 80 having a structure in which a positive electrode 10 and a negative electrode 20 are stacked with a separator 40 therebetween. The electrode assembly 80 has a construction which includes, as in typical lithium secondary batteries, certain battery constituent materials (positive and negative electrode active materials, positive and negative electrode current collectors, a separator, etc.). In this embodiment, the positive electrode 10 has a positive electrode current collector (which, in this case, is made of aluminum) 12 and has positive electrode active material layers 14 that include a positive electrode active material formed on both sides of the positive electrode current collector. The negative electrode 20 has a negative electrode current collector 22 (which, in this case, is made of copper) and has negative electrode active material layers 24 that include a negative electrode active material formed on both sides of the negative electrode current collector.

The lithium secondary battery used in this embodiment additionally has a porous heat resistant layer 42 between the separator 40 and at least one electrode from among the positive electrode 10 and the negative electrode 20. In this embodiment, the porous heat-resistant layer 42 is provided on one side of the separator 40, being disposed at the interface between the positive electrode 10 and the separator 40. In this embodiment, the porous heat-resistant layer 42 is formed over a range, of the separator 40, that encompasses at least the region opposite the positive electrode active material layer 14 of the positive electrode 10. As schematically shown in FIG. 2, this porous heat-resistant layer 42 includes hollow particles 44 made of an inorganic material and also includes a binder 46. The hollow particles 44 are fixed to the surface of the separator 40 by the binder 46, which also binds the hollow particles 44 to each other. Numerous gaps 48 are formed between mutually neighboring hollow particles 44 at sites not bonded by the binder 46. By having these gaps 48 retain nonaqueous electrolyte (in this case, a nonaqueous electrolyte in liquid form; i.e., a nonaqueous electrolyte solution)—that is, by impregnating a nonaqueous electrolyte solution into the porous heat-resistant layer 42, the movement of lithium ions between both electrodes 10 and 20 is ensured, enabling sufficient battery power to be obtained.

<Hollow Particles>

The hollow particles 44 used in the porous heat-resistant layer 42 are particles having a hollow structure with a shell 44a made of an inorganic material and a hollow portion 44b formed on the inside thereof. The material making up the shell 44a is preferably a material having high electrical insulating properties and a higher melting point than the separator 40. Illustrative examples include inorganic compounds such as alumina, boehmite, magnesia, titania, silica, zirconia, zinc oxide, iron oxide, ceria and yttria. Especially preferred inorganic compounds include alumina, boehmite, magnesia and titania. These inorganic materials may be used singly or two or more may be used in combination.

<Method of Manufacturing Hollow Particles>

With regard to the hollow particles having such a shell 44a and the method of manufacture these particles, use may be made of such hollow particles and such a method that are already public knowledge. For example, in the manufacture of alumina hollow particles, it is possible to mix resin particles into a solution containing an aluminum hydroxide starting material, and induce the aluminum hydroxide to deposit around the resin particles. By then firing the deposited material, the aluminum hydroxide becomes alumina, enabling the formation of a shell 44a. At the same time, the resin particles are transformed into combustion gases, as a result of which the resin portion forms a hollow portion 44b. This enables a hollow particle 44 to be formed.

By thus forming a hollow portion 44b in the particles 44 making up the porous heat-resistant layer 42, the number of pores within the porous heat-resistant layer 42 increases on account of these hollow portions 44b, enabling the porosity to be made larger without enlarging the gaps 48 between the hollow particles 44. Hence, compared with cases in which conventional solid particles (particles without a space at the interior) are used, the ionic permeability of the porous heat-resistant layer 42 can be increased while keeping the same degree of adhesion to the separator. This is advantageous in terms of enhancing the high-rate characteristics of the lithium secondary battery (e.g., the ability to suppress a rise in resistance in high-rate cycling). That is, when the porous heat-resistant layer 42 has a poor ionic permeability, the movement of ions between the positive and negative electrodes is hindered by this porous heat-resistant layer 42. As a result, with repeated charging and discharging of the battery, an imbalance tends to arise in the distribution of lithium salt concentration within the electrode assembly. When an imbalance in the distribution of lithium salt concentration arises within the electrode assembly, the battery response becomes relatively slow in areas where the lithium salt concentration is relatively low, and so the high rate discharge performance of the overall battery decreases. Because the battery reactions are concentrated in areas where the lithium salt concentration is relatively high, the deterioration of these areas is accelerated. All of these effects may become factors which lower the durability (worsen the performance) of the lithium secondary battery to charge-discharge patterns involving repeated high-rate discharge (high-rate charge-discharge cycling). By contrast, in the present embodiment, compared with cases in which conventional solid particles are used, the ionic permeability of the porous heat-resistant layer 42 can be increased while maintaining the same degree of adhesion to the separator 40, thus making it possible to construct a high-performance lithium secondary battery which has excellent high-rate characteristics and in which the porous heat-resistant layer 42 does not readily peel from the separator 40.

<Open Holes>

In order to connect the hollow portion 44*b* to the exterior, the individual hollow particles 44 may have an open hole which passes through the shell 44*a*. With such hollow particles 44, the nonaqueous electrolyte solution readily comes and goes through the open hole between the hollow portion 44*b* and the exterior, allowing suitable replacement of the electrolyte solution in the hollow portion 44*b*. Hence, the ionic permeability of the porous heat-resistant layer 42 can be reliably increased. With such hollow particles 44, the nonaqueous electrolyte solution more reliably enters into the interior of the hollow portion 44*b*, enabling the above effects to be more easily achieved.

<Shape and Diameter of Hollow Particles>

The shape (external shape) of the hollow particles 44 is not particularly limited. From the standpoint of for example, the mechanical strength and ease of production, preferred use can generally be made of substantially spherical hollow particles. The size (average particle diameter) of the hollow particles is preferably larger than the average pore diameter in the separator. For example, the use of hollow particles having an average particle diameter of at least about 0.1 μm is preferred, with a particle diameter of at least about 0.3 μm being more preferred, and a particular diameter of at least 0.5 μm being especially preferred. If the average particle diameter of the hollow particles is too small, adjustment to the desired hollowness is difficult, resulting in a large variability in hollowness, in addition to which the battery performance-enhancing effects associated with the use of hollow particles tend to decrease. On the other hand, if the average particle diameter of the hollow particles is too large, the strength of the particles themselves tends to be inadequate. Hence, it is generally preferable to use hollow particles having an average particle diameter of not more than about 3 μm (more preferably not more than 2 μm, and most preferably not more than 1 μm). The average particle diameter of the hollow particles can be determined by a method known to this field, such as measurement based on a laser diffraction scattering method. In the art disclosed herein, the hollow particles have hollow portions 44*b* therein that are typically a single hole (a single cavity), and differ in structure from porous (sponge-like) particles. In particles having a porous structure, because ion migration paths form due to connections between small pores within the particle, the above-described ionic permeability-enhancing effect of the hollow particles 44 is not adequately manifested.

<Hollowness>

The hollow particles 44 have a hollowness which is preferably from about 3% to about 30%. If the hollowness is too much smaller than 3%, the amount of electrolyte solution that can be held in the hollow portions is small, as a result of which the battery performance-enhancing effects associated with the use of hollow particles may be inadequate. On the other hand, if the hollowness is too much larger than 30%, the performance-enhancing effects associated with the use of hollow particles become less pronounced and cease to be advantageous, in addition to which the strength of the particles themselves tends to be inadequate. As a result, the hollow particle structure may break due to stresses incurred in the course of battery manufacture and stresses incurred from volumetric changes in the electrode active material layer accompanying charging and discharging of the battery, as a consequence of which the desired effects may not be manifested or the persistence of such effects may be inadequate. Therefore, it is suitable for the hollowness to be generally within the range of 3% to 30%, preferably from 5% to 25%, more preferably from 10% to 25%, and most preferably from 15% to 20%.

The hollowness of the hollow particles can be controlled by varying the synthesis conditions when synthesizing the hollow particles. For example, as described above, alumina hollow particles can be synthesized by causing aluminum hydroxide to deposit around resin particles, then carrying out firing. In this case, by varying such synthesis conditions as the size (diameter) of the resin particles, the firing time and the firing temperature, the hollowness of the alumina hollow particles can be controlled as desired.

<BET Specific Surface Area>

The hollow particles 44 disclosed herein have a BET specific surface area which is preferably in the range of about 1.0 $m^2/g$ to 30 $m^2/g$. By using hollow particles 44 that satisfy this BET specific surface area in the porous heat-resistant layer 42 of lithium secondary batteries, batteries which stably exhibit a higher performance can be obtained. For example, it is possible to construct a lithium secondary battery having a small increase in resistance even with charge-discharge cycling (particularly charge-discharge cycling that includes high-rate discharge). The preferred range in the BET specific surface area differs also according to the material, although in general the range of 1.3 $m^2/g$ to 27 $m^2/g$ is suitable, the range of 1.8 $m^2/g$ to 22 $m^2/g$ is preferred, and the range of 2.8 $m^2/g$ to 22 $m^2/g$ is especially preferred. Measured values obtained by a general nitrogen adsorption method can be used as the specific surface area values.

<Crushing Strength>

In a preferred embodiment of the hollow particles 44 disclosed herein, the average crushing strength of the hollow particles 44 is at least about 100 MPa (e.g., from 100 MPa to 200 MPa). As used herein, "average crushing strength of hollow particles" refers to the value obtained by dynamic hardness measurement carried out using a flat diamond indenter having a diameter of 50 μm and at a loading rate of 10 mN/s. With hollow particles having such an average crushing strength, it is possible to construct a lithium secondary battery which stably exhibits a higher performance.

The porous heat-resistant layer 42 may include as inorganic particles not only the above-described hollow particles, but also solid particles (particles having no cavity at the interior). The material making up such solid particles may be the same as or different from that making up the hollow particles. By thus including solid particles in addition to hollow particles, the strength of the porous heat-resistant layer 42 can be increased. However, if the proportion of solid particles is increased too much, the performance enhancing effects (e.g., the enhancement in high-rate characteristics) associated with the use of hollow particles may be inadequate. In a preferred embodiment, of the inorganic particles included in the porous heat-resistant layer 42, at least 50 wt % are included as hollow particles. Substantially all of the inorganic particles included in the porous heat-resistant layer 42 may be hollow particles.

In addition to the above-described inorganic particles, the porous heat-resistant layer 42 may also include heat-resistant resin particles. The heat-resistant resin particles may be solid or hollow, or solid resin particles and hollow resin particles may both be used. The material making up these heat-resistant resin particles should be a polymer which is electrochemically stable and has a higher melting point (or heat decomposition temperature) than the separator. Preferred examples include polymers such as wholly aromatic polyimides and polyamides. Including heat-resistant resin particles in addition to inorganic particles can be helpful for making the battery more lightweight. However, from the standpoint of increasing the high-rate characteristics in the manner of the embodiment described above, it is preferable for the porous heat-resistant layer 42 to be formed primarily of inorganic particles (hollow particles).

<Binder>

In the lithium secondary battery according to this embodiment, such hollow particles 44 are included in the porous heat-resistant layer 42 together with a binder 46. In cases where the subsequently described porous heat-resistant layer-forming coating contains an aqueous solvent (a solution in which water or a mixed solvent formed primarily of water is used as the binder dispersing medium), a polymer which disperses or dissolves in an aqueous solvent can be used as the binder 46. Polymers which disperse or dissolve in an aqueous solvent are exemplified by acrylic resins. Preferred use may be made of acrylic resins which are homopolymers obtained by polymerizing one type of monomer, such as acrylic acid, methacrylic acid, acrylamide, methacrylamide, 2-hydroxyethyl acrylate, 2-hydroxyethyl methacrylate, methyl methacrylate, ethylhexyl acrylate or butyl acrylate. Alternatively, the acrylic resin may be a copolymer obtained by polymerizing two or more of the above monomers, it is also possible for the acrylic resin to be a mixture of two or more of the above homopolymers and copolymers. Aside from the above acrylic resin, use can also be made of polyolefin resins such as styrene-butadiene rubber (SBR) or polyethylene (PE), and polytetrafluoroethylene (PTFE). These polymers may be used singly or as combinations of two or more thereof. Of these, the use of an acrylic resin is preferred. The form of the binder is not particularly limited; that is, the binder may be used directly in a particulate form (powder form), or may be used as a solution-like or emulsion-like preparation. It is also possible to use two or more binders in respectively differing forms.

If necessary, the porous heat-resistant layer 42 may include materials other than the above-described hollow particles 44 and binder 46. Examples of such materials include various polymer materials which are capable of functioning as thickeners for the subsequently described porous heat-resistant layer-forming coating. Particularly in cases where an aqueous solvent is used, it is preferable to include a polymer that functions as the above thickener. Preferred use can be made of carboxymethyl cellulose (CMC) and methyl cellulose (MC) as the polymer that functions as a thickener.

<Proportions of Hollow Particles and Binder>

Although not particularly limited, the proportion of inorganic particles in the overall porous heat-resistant layer is typically at least about 50 wt % (e.g., from 50 wt % to 99 wt %), preferably at least 80 wt % (e.g., from 80 wt % to 99 wt %), and most preferably from about 90 wt % to about 99 wt %. The proportion of binder in the porous heat-resistant layer 42 is typically not more than about 40 wt %, preferably not more than 10 wt %, and most preferably not more than 5 wt % (e.g., from about 0.5 wt % to about 3 wt %). In cases where a porous heat-resistant layer-forming ingredient other than the hollow particles and the binder, such as a thickener, is included, the proportion of thickener included is set to preferably not more than about 3 wt %, and more preferably not more than about 2 wt % (e.g., from about 0.5 wt % to about 1 wt %). If the proportion of binder is too small, the anchorability of the porous heat-resistant layer 42 and the strength (shape retention) of the porous heat-resistant layer 42 proper decrease, which may give rise to undesirable effects such as cracking and flaking. On the other hand, if the proportion of the binder is too high, the gaps between particles in the porous heat-resistant layer 42 may be insufficient, possibly resulting in a decrease in the ionic permeability of the porous heat-resistant layer 42 (and, in turn, increasing the resistance of a secondary battery built using the porous heat-resistant layer 42).

<Method of Forming Porous Heat-Resistant Layer>

Next, the method of forming the porous heat-resistant layer 42 according to this embodiment is described. A paste-like material (here and below, this includes slurry-like or ink-like materials) obtained by mixing and dispersing the hollow particles, binder and a solvent may be used as the porous heat-resistant layer-forming coating for forming the porous heat-resistant layer 42. The porous heat-resistant layer 42 can be formed by applying a suitable amount of this paste-like coating to the surface of the separator 40 (on one side of the separator 40 in this case), then drying.

The solvent used in the porous heat-resistant layer-forming coating is exemplified by water and mixed solvents formed primarily of water. Solvents other than water that may be used within such a mixed solvent are of one, two or more types suitably selected from among organic solvents capable of uniformly mixing with water (e.g., lower alcohols, lower ketones). Alternatively, use may be made of an organic solvent such as N-methylpyrrolidone (NMP), pyrrolidone, methyl ethyl ketone, methyl isobutyl ketone, cyclohexanone, toluene, dimethylformamide, dimethylacetamide, or of a combination of two or more thereof. The content of solvent in the porous heat-resistant layer-forming coating is not particularly limited, but is preferably from 40 to 90 wt %, and more preferably about 50 wt %, of the overall coating.

The operation of mixing the above hollow particles and binder into a solvent may be carried out using a suitable mixer such as a ball mill, a homogenizer, a Dispermill®, Clearmix®, Filmix® or ultrasonic disperser. The porous heat-resistant layer 42 can be formed by applying the porous heat-resistant layer-forming coating onto the surface of the separator 40 and drying.

Conventional and ordinary means of application may be used without particular limitation in the operation of applying the porous heat-resistant layer-forming coating onto the surface of the separator 40. For example, application can be achieved by using a suitable coating apparatus (e.g., gravure coater, slit coater, die coater, comma coater, dip coater) to apply a suitable amount of the above-described porous heat-resistant layer-forming coating to a uniform thickness on one side of the separator 40. The applied material is then dried by suitable drying means (typically, at a temperature lower than the melting point of the separator 40; e.g., a temperature not higher than 110° C., such as from 30 to 80° C.), thereby removing solvent from the porous heat-resistant layer-forming coating. By removing solvent from the porous heat-resistant layer-forming coating, a porous heat-resistant layer 42 containing hollow particles and a binder can be formed.

<Hollowness of Porous Heat-Resistant Layer>

The porous heat-resistant layer 42 thus obtained includes, as described above, hollow particles 44 having a hollow structure with a shell 44a made of an inorganic material and a hollow portion 44b thrilled on the inside thereof. As a result, compared with cases in which conventional solid particles are used, the porosity can be increased without enlarging the gaps 48 between the hollow particles. This hollowness may be generally at least 45%, preferably at least 50%, and most preferably at least 53%. There is no particular upper limit in the hollowness, although the hollowness is generally not more than 65%, and preferably not more than 62%. Such a construction enables a lithium secondary battery having excellent high-rate characteristics to be built. In addition, because at least some portion of the above porosity is ensured by the hollow portions 44b in the hollow particles 44, adhesion to the separator 40 is better than in a case where the same degree of porosity is achieved using conventional solid particles. Therefore, a lithium secondary battery is obtained in which the porous heat-resistant layer 42 does not readily peel from the separator 40 and which thus has an excellent durability. The porosity of the porous heat-resistant layer 42 can be determined from the formula $(1-W_1/\rho_1 V_1) \times 100$, where $V_1$ is the apparent volume of the porous heat-resistant layer, $W_1$ is the mass of the layer, and $\rho_1$ is the true density of the materials making up the porous heat-resistant layer (i.e., the value obtained by dividing the mass $W_1$ by the sum of the solid volumes of the respective materials which contain no pores).

<Pore Ratio>

Although not subject to any particular limitation, letting the total volume of the pores formed in the porous heat-resistant layer 42 (i.e., the combined volume obtained by adding together the volume of pores formed outside of the hollow particles (typically, the gaps between particles) and the volume of pores formed within the hollow particles (typically, the hollow portions) be B1, and letting the volume of pores formed at the interior of the hollow particles be B2, the proportion accounted for by the volume B2 of the pores formed at the interior of the hollow particles, which proportion is expressed as $C=(B2/B1)\times 100$, is generally about $8\% \leq C \leq 47\%$, preferably $16\% \leq C \leq 47\%$, and most preferably $24\% \leq C \leq 37\%$. By providing the porous heat-resistant layer 42 with this pore ratio, it is possible to endow the porous heat-resistant layer 42 with both a high ionic permeability that has previously been impossible to achieve and also a good adhesion.

<Thickness of Porous Heat-Resistant Layer>

The thickness of the porous heat-resistant layer 42 is preferably from about 2 μm to about 18 μm, and more preferably from about 3 μm to about 12 μm. If the thickness of the porous heat-resistant layer 42 is too large, the ionic permeability of the porous heat-resistant layer 42 may decrease. On the other hand, if the thickness of the porous heat-resistant layer 42 is too small, the strength (shape retention) may decrease and there is a possibility that film breakage will occur. The thickness of the porous heat-resistant layer 42 can be determined by the image analysis of images taken with a scanning electron microscope (SEM).

Grammage of Porous Heat-Resistant Layer>

The weight (grammage) of the porous heat-resistant layer 42 per unit surface area of the separator 40 is preferably from about 0.3 b/cm² to about 2 g/cm², and more preferably from about 0.5 g/cm² to about 1.5 g/cm². If the weight (grammage) of the porous heat-resistant layer 42 is too small, the heat shrinkage suppressing effect of the porous heat-resistant layer 42 may diminish or the short circuit-preventing effect may decrease. On the other hand, if the weight (grammage) of the porous heat-resistant layer 42 is too large, the resistance may increase and the battery characteristics (charge/discharge characteristics, etc.) may decrease.

<Separator>

Next, the separator 40 on which the porous heat-resistant layer 42 is formed is described. Preferred use may be made of, for example, a polyolefin resin such as polyethylene (PE) or polypropylene (PP) as the material making up the separator 40. The separator 40 has a construction which may be a single-layer construction or a multilayer construction. Here, the separator 40 is made of a PE-based resin. Preferred use can be made of an ethylene homopolymer as the PE-based film. Alternatively, the PE-based resin may be a resin having a content of recurring units derived from ethylene that is at least 50 wt %, the resin being a copolymer obtained by polymerizing ethylene with an α-olefin that is copolymerizable therewith or a copolymer obtained by polymerizing ethylene with at least one other monomer that is copolymerizable therewith. The α-ethylene is exemplified by propylene. Examples of other monomers include conjugated dienes (e.g., butadiene) and acrylic acid.

The separator 40 is preferably made of a polyethylene having a shutdown temperature of from about 120° C. to about 140° C. (typically, from 125° C. to 135° C.). This shutdown temperature is sufficiently lower than the heat-resistance temperature of the battery (e.g., about 200° C. or higher). Such polyethylenes are exemplified by polyolefins generally referred to as high-density polyethylenes, straight-chain (linear) low-density polyethylenes or the like. Alternatively, use can also be made of various types of medium-density and low-density branched polyethylenes. Where necessary, additives such as various types of plasticizers and antioxidants may also be included.

A monoaxially oriented or biaxially oriented porous resin sheet may be advantageously used as the separator 40. Of these, a porous resin sheet that has been monoaxially oriented in the machine direction (MD) is especially preferred because it has a suitable strength yet undergoes little heat shrinkage in the width direction. For example, by using a separator which includes such a resin sheet that has been monoaxially oriented in the machine direction, heat shrinkage in the machine direction can be suppressed when the separator has been wound together with a continuous sheet-like positive electrode and a continuous sheet-like negative electrode. Accordingly, a porous resin sheet that has been monoaxially oriented in the machine direction is especially preferred as one material making up the separator within such a coiled electrode assembly.

The thickness of the separator 40 is preferably from about 10 μm to about 30 μm, and more preferably form about 16 μm to about 20 μm. If the thickness of the separator 40 is too large, the ionic permeability of the separator 40 may decrease. On the other hand, if the thickness of the separator 40 is too small, film breakage may arise. The thickness of the separator 40 can be determined by image analysis of an image taken with a SEM.

The porosity of the separator 40 is preferably from about 30% to about 70%, and more preferably from about 45% to about 60%. If the porosity of the separator 40 is too large, the strength may be inadequate and film breakage may arise. On the other hand, if the porosity of the separator 40 is too small, the amount of electrolyte solution that can be held in the separator 40 becomes smaller, as a result of which the ionic permeability may decrease. The porosity of the separator 40 can be determined from the formula $(1-W_2/\rho_2 V_2) \times 100$, where $V_2$ is the apparent volume of the separator, $W_2$ is the mass of the separator, and $\rho_2$ is the true density of the material making up the separator (i.e., the value obtained by dividing the mass $W_2$ by the solid volume of the material which contains no pores).

Here, the separator 40 is formed of a single-layer structure which is a PE layer, although it may be a resin sheet having a multilayer structure. For example, it may be formed of a three-layer structure consisting of a PP layer, a PE layer placed on the PP layer, and a PP layer placed on the PE layer. In this case, the porous heat-resistant layer 42 may be placed on top of the PP layer appearing on the surface of the separator 40. The number of layers in the resin sheet having a multilayer structure is not limited to three, and may be two or may be four or more.

<Lithium Secondary Battery>

An embodiment of a lithium secondary battery built using two separators 40A and 40B, each having formed on one side thereof a porous heat-resistant layer 42, is described below while referring to the diagrams, although it is not the intention here to limit the invention to this embodiment. That is, so long as the above-described porous heat-resistant layer 42 and separators 40A and 40B are used, no particular limitation is imposed on the shape (exterior shape and size) of the lithium secondary battery that is built. The following embodiment is explained using, by way of illustration, a lithium secondary battery having a construction in which a coiled electrode assembly and an electrolyte solution are housed within a battery case having a prismatic shape.

FIGS. 3 to 7 schematically show the construction of a lithium secondary battery according to an embodiment of the invention. This lithium secondary battery 100 has a construction in which an electrode assembly (coiled electrode assembly) 80 in a form where a continuous positive electrode sheet 10 and a continuous negative electrode sheet 20 are stacked together with continuous separators 40A and 40B therebetween is housed, together with a nonaqueous electrolyte (nonaqueous electrolyte solution) 90 (FIG. 4) that has been impregnated into the electrode body, in a battery case 50 having a box-like shape capable of housing the coiled electrode assembly 80.

The battery case 50 has a box-like case body 52 that is open on a top end and a cover 54 which closes the opening. Preferred use may be made of a metal material such as aluminum, steel or nickel-plated stainless steel as the material making up the battery case 50. Alternatively, the battery case 50 may be molded from a resin material such as polyphenylene sulfide resin (PPS) or polyimide resin. A positive electrode terminal 70 electrically connected to the positive electrode 10 of the coiled electrode assembly 80 and a negative electrode terminal 72 electrically connected to the negative electrode 20 of the coiled electrode assembly 80 are provided on the top side (i.e., the cover 54) of the battery case 50. The coiled electrode assembly 80 is housed together with the nonaqueous electrolyte 90 at the interior of the battery case 50.

<Coiled Electrode Assembly>

Figure 5:
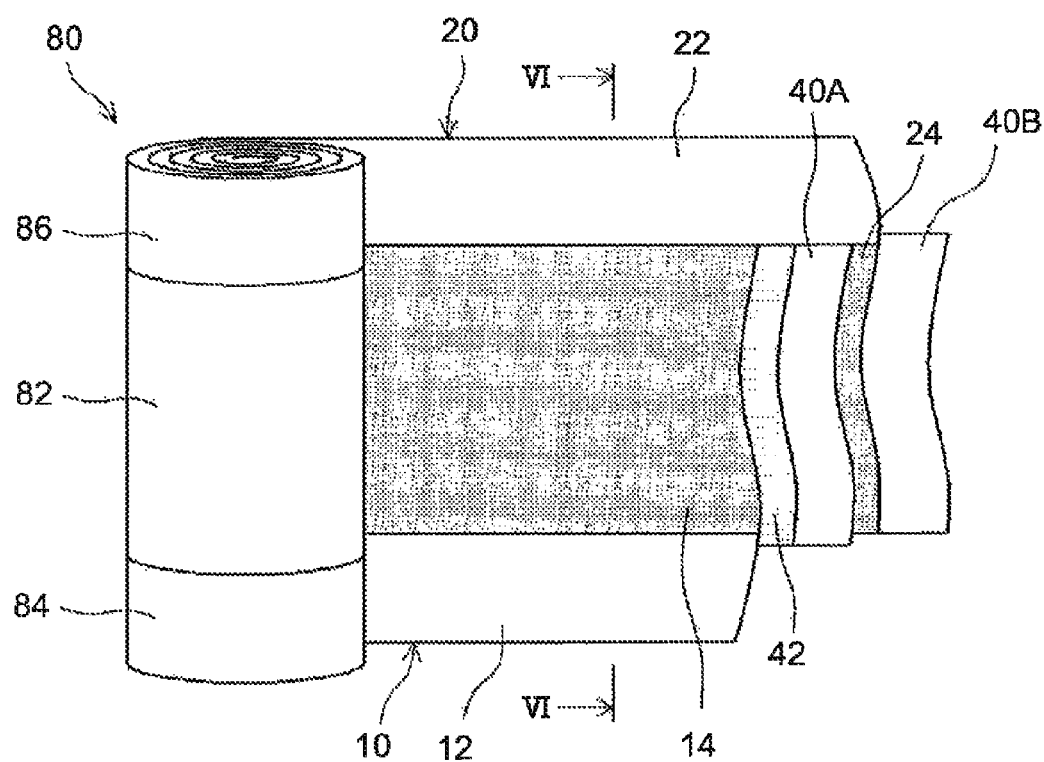
FIG. 5 is a schematic view illustrating a coiled electrode assembly such as may be used in an embodiment of the invention.

Aside from including the above-described hollow particle-containing porous heat-resistant layer 42, the coiled electrode assembly 80 of this embodiment is the same as the coiled electrode assembly of a conventional lithium secondary battery and has, as shown in FIG. 5, a continuous sheet structure (sheet-like electrode assembly) in the step prior to assembly of the coiled electrode assembly 80.

<Positive Electrode Sheet>

The positive electrode sheet 10 has a structure wherein positive electrode active material layers 14 that include a positive electrode active material are held on both sides of a foil-like positive electrode current collector 12 in the form of a continuous sheet. However, a positive electrode active material layer-free area where the positive electrode active material layer 14 has not been deposited is formed along one edge of the positive electrode sheet 10 (the lower edge portion in FIG. 5) in the width direction thereof, leaving the positive electrode current collector 12 exposed over a fixed width. Aluminum foil or some other metal foil suitable for the positive electrode is preferably used as the positive electrode current collector 12. One, two or more materials which have hitherto been used in lithium secondary batteries may be used without particular limitation as the positive electrode active material. The art disclosed herein can be advantageously applied to, for example, positive electrode active materials which are made primarily of an oxide containing as the constituent metal elements lithium and one, two or more transition metal elements (i.e., a lithium-transition metal oxide), such as lithium nickel oxides (e.g., $LiNiO_2$), lithium cobalt oxides (e.g., $LiCoO_2$) and lithium manganese oxides (e.g., $LiMn_2O_4$).

In addition to the positive electrode active material, the positive electrode active material layer 14 may optionally include one, two or more materials which are capable of being used as constituents of the positive electrode active material layer in ordinary lithium secondary batteries. Examples of such materials include conductive materials. Conductive materials that may be advantageously used include carbon materials such as carbon powders (e.g., acetylene black (AB)) and carbon fibers. Alternatively, use may be made of conductive metal powders such as nickel powder. Other materials that may be used as ingredients of the positive electrode active material layer include various types of polymer materials which are capable of serving as positive electrode active material binders (e.g., polyvinylidene fluoride (PVDF)).

<Negative Electrode Sheet>

The negative electrode sheet 20, like the positive electrode sheet 10, also has a structure in which negative electrode active material layers 24 that include a negative electrode active material are held on both sides of a foil-like negative electrode current collector 22 in the form of a continuous sheet. However, a negative electrode active material layer-free area where the negative electrode active material layer 24 has not been deposited is formed along one edge of the negative electrode sheet 20 (the upper edge portion in FIG. 5) in the width direction thereof, leaving the negative electrode current collector 22 exposed over a fixed width. Copper foil or some other metal foil suitable for the negative electrode is preferably used as the negative electrode current collector 22. One, two or more materials which have hitherto been used in lithium secondary batteries may be used without particular limitation as the negative electrode active material. Preferred examples include carbonaceous materials such as graphite carbon or amorphous carbon, lithium-transition metal oxides (e.g., lithium-titanium oxides) and lithium-transition metal nitrides.

In addition to the negative electrode active material, the negative electrode active material layer 24 may optionally include one, two or more materials which are capable of being used as constituents of the negative electrode active material layer in ordinary lithium secondary batteries. Examples of such materials include polymer materials which are capable of serving as negative electrode active material binders (e.g., styrene-butadiene rubber (SBR)), and polymer materials which are capable of serving as thickeners for negative electrode active material layer-forming pastes (e.g., carboxymethyl cellulose (CMC)).

Figure 6:
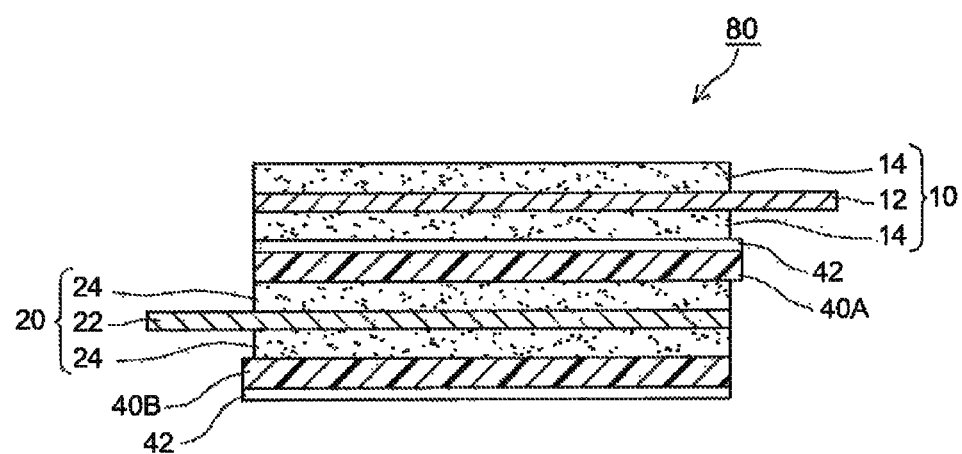
FIG. 6 is a diagram schematically showing a section taken along line VI-VI in FIG. 5.
Figure 7:
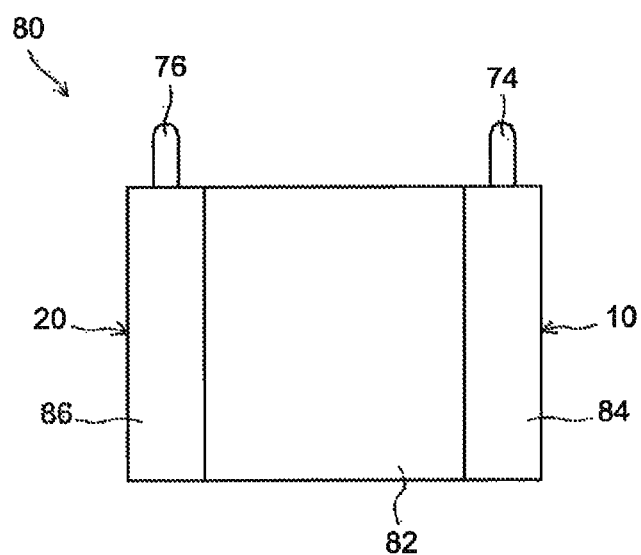
FIG. 7 is a front view schematically showing a coiled electrode assembly such as may be used in an embodiment of the invention.

When fabricating a coiled electrode assembly 80, as shown in FIGS. 5 and 6, the separator 40B, the negative electrode sheet 20, the separator 40A and the positive electrode sheet 10 are stacked as successive layers. At this time, the positive electrode sheet 10 and the negative electrode sheet 20 are arranged over each other with the positive electrode sheet 10 and the negative electrode sheet 20 somewhat offset in the width direction, such that the positive electrode active material layer-free portion of the positive electrode sheet 10 and the negative electrode active material layer-free portion of the negative electrode sheet 20 respectively protrude out from both sides of the separators 40A and 40B in the width direction thereof. At this time, the separator 40A sandwiched between the positive electrode sheet 10 and the negative electrode sheet 20 is positioned such that the porous heat-resistant layer 42 formed on one side of this separator 40A faces the positive electrode sheet 10. In addition, the separator 40B arranged on the bottom side of the negative electrode sheet 20 is positioned such that the porous beat-resistant layer 42 formed on one side of this separator 40B faces the side opposite to the negative electrode sheet 20 (so as to appear on the surface of the stack). The coiled electrode assembly 80 can be fabricated by thus arranging the separator 40B, the negative electrode sheet 20, the separator 40A and the positive electrode sheet 10 over each other, and coiling these sheets 10, 20, 40A and 40B in the machine direction thereof while applying tension to each sheet.

A coiled core portion 82 (i.e., the portion where the positive electrode active material layer 14 of the positive electrode sheet 10, the negative electrode active material layer 24 of the negative electrode sheet 20, and the separators 40A and 40B are tightly stacked) is formed at the center portion in the direction of the coiling axis for the coiled electrode assembly 80. In addition, the electrode active material layer-free portions of the positive electrode sheet 10 and the negative electrode sheet 20 respectively protrude outward from the coiled core portion 82 at both ends of the coiled electrode assembly 80 in the direction of the coiling axis. A positive electrode current collecting plate 74 and a negative electrode current collecting plate 76 are additionally provided at, respectively, the positive electrode side protruding portion (that is, the portion on which the positive electrode active material layer 14 has not been formed) 84 and the negative electrode side protruding portion (the portion on which the negative electrode active material layer 24 has not been formed) 86, and are electrically connected to, respectively, the above-mentioned positive electrode terminal 70 and negative electrode terminal 72.

<Nonaqueous Electrolyte>

Next, the coiled electrode assembly 80 is inserted into the case body 52 through the opening at the top of the ease body 52, in addition to which a suitable nonaqueous electrolyte 90 is placed within (poured into) the case body 52. This nonaqueous electrolyte has a composition which typically includes a suitable nonaqueous solvent and a supporting salt. Examples of nonaqueous solvents that may be used include ethylene carbonate (EC), ethyl methyl carbonate (EMC), dimethyl carbonate (DMC), diethyl carbonate (DEC) and propylene carbonate (PC). Examples of supporting salts that may be advantageously used include $LiPF_6$, $LiBF_4$, $LiAsF_6$ and $LiCF_3SO_3$.

The opening is then sealed such as by welding the cover 54 to the case body 52, thereby completing assembly of the lithium secondary battery 100 according to this embodiment. The sealing process for the ease 50 and the process of adding (pouring) the electrolyte may be the same as in methods carried out in the fabrication of conventional lithium secondary batteries, and are not essential features of the invention. This completes the construction of the lithium secondary battery 100 according to this embodiment.

In the lithium secondary battery 100 built as described above, because the adhesive strength between the separators 40A and 40B and the porous heat-resistant layer 42 is high and the porous heat-resistant layer 42 has a good ionic permeability, the battery exhibits an excellent battery performance. For example, a battery which is endowed with at least excellent high-rate characteristics or an excellent durability (and preferably both) can be provided.

Test examples relating to this invention are described below, although it is not the intention here to limit the invention to the embodiments shown in the following test examples. In these test examples, porous heat-resistant layers were formed on the separator surfaces using hollow particles that had about the same average particle diameters (D50) but respectively differing hollownesses. The porous heat-resistant layers were given the same thicknesses. In addition, test batteries were fabricated using these porous heat-resistant layer-bearing separators. A high-rate cycle test was carried out using these test batteries, and the influence of the hollow particle hollowness on the battery performance was assessed.

<Samples 1 to 8>

[Porous Heat-Resistant Layer-Bearing Separators]

In these examples, as shown in Table 1, alumina powders having average particle diameters of about 0.8 m were furnished for use. By changing the alumina powder synthesis conditions (the above-described resin particle size, firing time, firing temperature, etc.), a total of eight types of alumina powders having mutually differing hollownesses were prepared. The crushing strengths of these alumina powders were measured by the method described above. The results are as shown in Table 1.

The above-described alumina powders, an acrylic polymer as the binder and CMC as the thickener were mixed together with water so as to give a mass ratio for these materials, expressed as the solids ratio, of 96:4, thereby preparing a porous heat-resistant layer-forming coating. This porous heat-resistant layer-forming coating was applied with a gravure roll to one side of a separator (a separator having a thickness of 18 μm and a PP/PE/PP three-layer construction was used) and dried, thereby producing porous heat-resistant layer-bearing separators for Samples 1 to 8 which consisted of a porous heat-resistant layer formed on one side of a separator. The thickness of the porous heat-resistant layer was set to 4 μm.

Lithium secondary batteries for testing were fabricated using the resulting porous heat-resistant layer-hearing separators according to Samples 1 to 8. The lithium secondary batteries for testing were fabricated as described below.

[Positive Electrode Sheet]

A $LiNi_{1/3}Co_{1/3}Mn_{1/3}O_2$ powder as the positive electrode active material, AB (conductive material) and PVDF (binder) were mixed together with N-methylpyrrolidone (NMP) so as to set the mass ratio of these materials to 90:5:5, thereby preparing a positive electrode active material layer-forming paste. This positive electrode active material layer-forming paste was coated in the form of a band onto both sides of a 15 μm thick continuous aluminum foil (positive electrode current collector) and dried, thereby producing a positive electrode sheet in which a positive electrode active material layer is provided on each side of a positive electrode current collector. The amount of positive active material layer-forming paste applied was adjusted so as to be about 10.2 mg/cm² (solids basis) for both sides combined.

[Negative Electrode Sheet]

An amorphous carbon-coated graphite powder (graphite powder made of graphite particles coated on the surfaces with amorphous carbon) as the negative electrode active material, SBR and CMC were mixed together with water so as to set the mass ratio of these materials to 98:1:1, thereby preparing a negative electrode active material layer-forming paste. This negative electrode active material layer-forming paste was coated onto both sides of a 10 μm thick continuous copper foil (negative electrode current collector) and dried, thereby producing a negative electrode sheet in which a negative electrode active material layer is provided on each side of a negative electrode current collector. The amount of negative active material layer-forming paste applied was adjusted so as to be about 7.5 mg/cm² (solids basis) for both sides combined.

[Lithium Secondary Battery]

Next, the positive electrode sheet and the negative electrode sheet were stacked together with two porous heat-resistant layer-hearing separators. At this time, the separator sandwiched between the positive electrode sheet and the negative electrode sheet was situated such that the porous heat-resistant layer formed on one side of the separator faces the positive electrode sheet. At the same time, as shown in FIGS. 5 and 6, the separator arranged on the bottom side of the negative electrode sheet was situated such that the porous heat-resistant layer formed on one side of this separator faces the side opposite from the negative electrode sheet (i.e., so as to appear on the surface of the stack). Next, the stack is coiled, and the coiled body is laterally pressed and flattened, thereby producing a coiled electrode assembly having a flattened shape. This coiled electrode assembly was placed together with a nonaqueous electrolyte solution in a box-like battery case, and the opening in the battery case was airtightly sealed. A solution obtained by dissolving LiPF$_6$ as the supporting salt to a concentration of about 1 mol/L in a mixed solvent containing EC and DEC in a volumetric ratio of 3:7 was used as the nonaqueous electrolyte solution. Following assembly of the lithium secondary battery in this way, initial charge-discharge treatment (conditioning) was carried out in the usual manner, giving a lithium secondary battery for testing. This lithium secondary battery had a rated capacity of 200 mAh.

[Resistance Rise Ratio in High-Rate Cycling]

The resulting lithium secondary batteries for testing containing the respective samples were adjusted to a state of charge (SOC) of 60%, and constant-current (CC) discharging was carried out at 40 C for 10 seconds. The initial IV resistance was determined from the slope of the linear approximation line for the current (I)—voltage (V) plot values. Here, 1 C refers to the amount of current at which the rated capacity can be discharged in 1 hour.

Next, a charge-discharge pattern consisting of repeated 10-second high-rate pulse discharges at 40 C was applied, and a charge-discharge cycle test was carried out. Specifically, in a room temperature (approximately 25° C.) environment, 10 seconds of high-rate pulse discharge was carried out at 40 C, subsequent to which charging was carried out at 2 C to a voltage corresponding to a SOC of 60% (3.72 V) and followed by Charging at that voltage until a total charging time of 100 seconds was reached. This charge-discharge cycle was repeated without interruption 10,000 times. The IV resistance following this charge-discharge cycle test was measured, and the ratio of the IV resistance following the charge-discharge cycle test relative to the initial IV resistance (resistance rise ratio) was calculated. The results are shown in Table 1 and FIG. 8. In Table 1 and FIG. 8, the resistance rise ratio X shows values relative to a value of 100% for the resistance rise ratio Y when the solid particles (hollowness, 0%) in Sample 1 were used; that is, the values expressed as (resistance rise ratio X of the respective Samples 1 to 8)/(resistance rise ratio Y of Sample 1)×100. It is fair to say that, as this relative value of the resistance rise ratio becomes larger, the performance with repeated high-rate discharge deteriorates significantly.

TABLE 1

| | Particle | Hollow-ness (%) | Average particle diameter (μm) | Resistance rise ratio (relative value) (%) | Crushing strength (MPa) |
|---|---|---|---|---|---|
| Sample 1 | alumina | 0 | 0.82 | 100 | 155 |
| Sample 2 | alumina | 0.6 | 0.86 | 98 | 148 |
| Sample 3 | alumina | 1.8 | 0.77 | 97.5 | 143 |
| Sample 4 | alumina | 3.7 | 0.78 | 92 | 149 |
| Sample 5 | alumina | 5.3 | 0.85 | 91 | 144 |
| Sample 6 | alumina | 12 | 0.81 | 84 | 128 |
| Sample 7 | alumina | 22.4 | 0.79 | 82 | 115 |
| Sample 8 | alumina | 30.7 | 0.83 | 78 | 34 |

Figure 8:
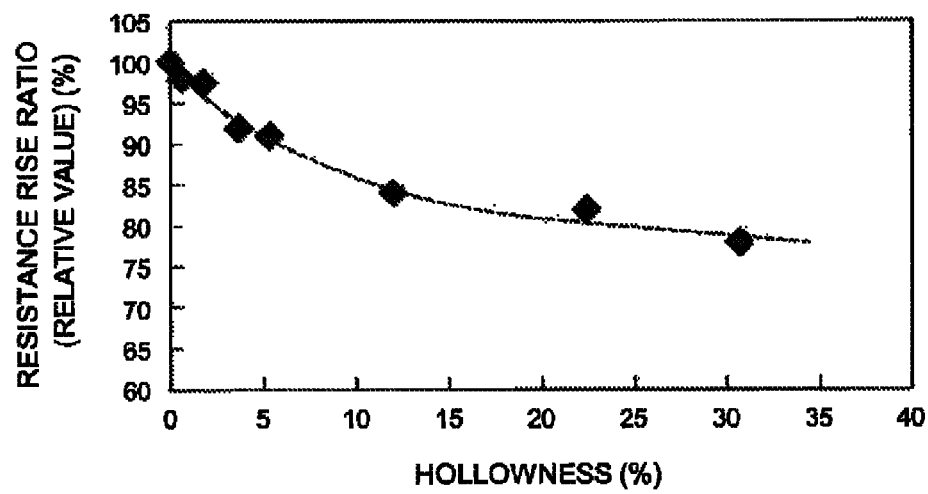
FIG. 8 is a graph showing the relationship between hollowness and resistance rise ratio.

As shown in Table 1 and FIG. 8, in the batteries where hollow particles were used (Samples 2 to 8), the resistance rise ratio is held to a lower value than in the battery where solid particles were used (Sample 1). It was confirmed from these results that the high-rate characteristics can be improved by using hollow particles. Also, the resistance rise ratio showed a tendency to decrease as the hollowness of the alumina particles increases. In the case of the batteries furnished for testing here, by setting the hollowness to 3.7% or more, it was possible to achieve a very low resistance rise ratio (relative value) of 92% or less. From the standpoint of suppressing the rise in resistance due to high-rate cycling, an alumina particle hollowness of at least about 3% is suitable (Samples 4 to 8), and a hollowness of at least 10% (Samples 6 to 8) is preferred. However, when the hollowness was too large, the crushing strength of the particles tended to decrease. From the standpoint of ensuring a good crushing strength, a hollowness of about 30% or less is suitable (Samples 2 to 7), and a hollowness of 20% or less is preferred (Samples 2 to 6). From the standpoint of both suppressing high-rate cycle deterioration and ensuring a good crushing strength, a hollowness of from about 3% to about 30% is suitable, a hollowness of from 10% to 25% is preferred, and a hollowness of from 15% to 25% is especially preferred.

<Samples 9 to 14>

Aside from using alumina powder having an average particle diameter of about 0.5 μm and setting the hollowness as shown in Table 2, porous heat-resistant layer-bearing separators serving as Samples 9 to 14 were produced in the same way as for Samples 1 to 8. Lithium secondary batteries for testing were then built in the same way as for Samples 1 to 8, and their performances (resistance rise ratio due to high-rate cycling) were evaluated. The results are shown in Table 2 and FIG. 9.

TABLE 2

|  | Particle | Hollow-ness (%) | Average particle diameter (μm) | Resistance rise ratio (relative value) (%) | Crushing strength (MPa) |
| --- | --- | --- | --- | --- | --- |
| Sample 9 | alumina | 0 | 0.47 | 100 | 160 |
| Sample 10 | alumina | 0.6 | 0.55 | 99 | 154 |
| Sample 11 | alumina | 5.4 | 0.53 | 93 | 138 |
| Sample 12 | alumina | 11.3 | 0.58 | 87 | 139 |
| Sample 13 | alumina | 20.4 | 0.51 | 85 | 126 |
| Sample 14 | alumina | 33.2 | 0.52 | 84 | 52 |

Figure 9:
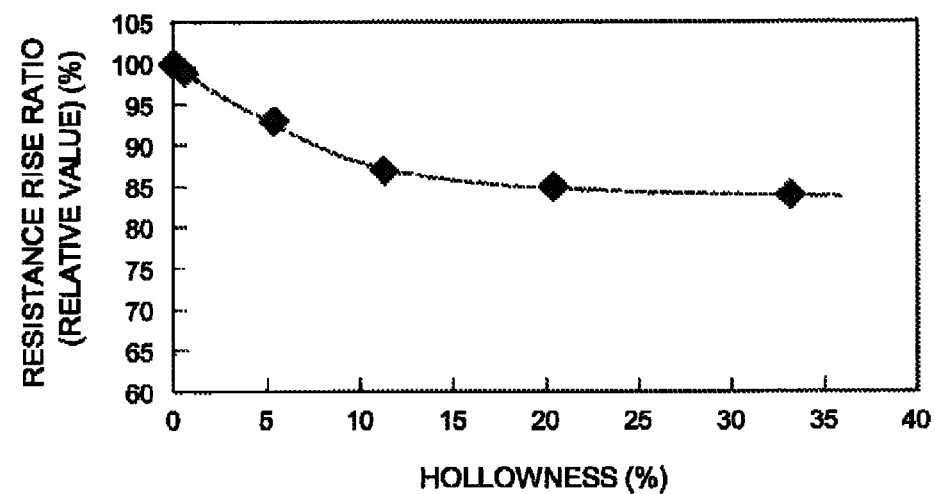
FIG. 9 is a graph showing the relationship between hollowness and resistance rise ratio.

As shown in Table 2 and FIG. 9, in Sample 14 having an average particle diameter of about 0.5 μm and a hollowness of 33.2%, the crushing strength was 52 MPa, which is larger than the above crushing strength in Sample 8 (Table 1: 34 MPa) having an average particle diameter of about 0.8 μm and a hollowness of 30.7%. From these results, it was possible to confirm that the decrease in particle strength associated with greater hollowness can be suppressed by making the average particle diameter of the alumina particles smaller.

<Samples 15 to 19>

Aside from using an alumina powder having an average particle diameter of about 1.0 μm and setting the hollowness to the values shown in Table 3, porous heat-resistant layer-bearing separators serving as Samples 15 to 19 were produced in the same way as for Samples 1 to 8. Next, lithium secondary batteries for testing were built in the same way as for Samples 1 to 8, and the performances (resistance rise ratio due to high-rate cycling) were evaluated. The results are shown in Table 3 and FIG. 10.

TABLE 3

|  | Particle | Hollow-ness (%) | Average particle diameter (μm) | Resistance rise ratio (relative value) (%) | Crushing strength (MPa) |
| --- | --- | --- | --- | --- | --- |
| Sample 15 | alumina | 0 | 1.02 | 100 | 155 |
| Sample 16 | alumina | 3.7 | 1.08 | 90 | 128 |
| Sample 17 | alumina | 8.7 | 1.04 | 84 | 143 |
| Sample 18 | alumina | 15.3 | 1.01 | 80 | 144 |
| Sample 19 | alumina | 30.5 | 0.98 | 76 | 34 |

Figure 10:
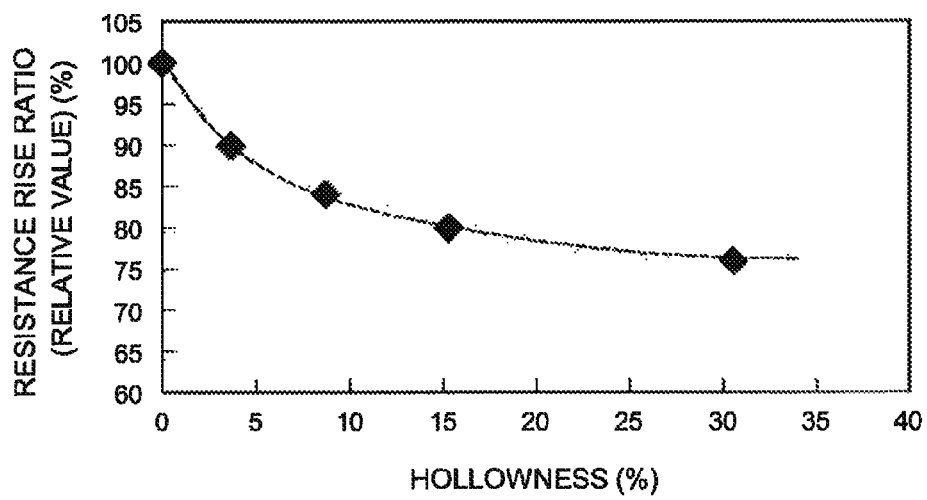
FIG. 10 is a graph showing the relationship between hollowness and resistance rise ratio.

As shown in Table 3 and FIG. 10, in Sample 16 having an average particle diameter of about 1.0 μm and a hollowness of 3.7%, the resistance rise ratio (relative value) was 90%, which is smaller than the resistance rise ratio in Sample 4 (Table 1: 92%) having an average particle diameter of about 0.8 μm and a hollowness of 3.7%. From these results, it was possible to confirm that, by making the average particle diameter of the alumina particles larger, high-rate cycle performance deterioration can be further ameliorated.

<Samples 20 to 22>

Aside from using a magnesia powder having an average particle diameter of about 1.0 μm as the hollow particles and setting the hollowness to the values shown in Table 4, porous heat-resistant layer-bearing separators serving as Samples 20 to 22 were produced in the same way as for Samples 1 to 8. Next, lithium secondary batteries for testing were built in the same way as for Samples 1 to 8, and the performances (resistance rise ratio due to high rate cycling) were evaluated. The results are shown in Table 4.

TABLE 4

|  | Particle | Hollow-ness (%) | Average particle diameter (μm) | Resistance rise ratio (relative value) (%) | Crushing strength (MPa) |
| --- | --- | --- | --- | --- | --- |
| Sample 20 | magnesia | 0 | — | 100 | — |
| Sample 21 | magnesia | 4.3 | 1.03 | 88 | 84 |
| Sample 22 | magnesia | 10.3 | 0.94 | 82 | 75 |

As is apparent from Table 4, cases in which magnesia powder was used as the hollow particles exhibited the same tendency as alumina powder, with the resistance rise ratio tending to decrease as the hollowness of the magnesia particles increases. However, the crushing strength tended to decrease compared with cases in which alumina powder was used. From the standpoint of increasing the crushing strength, the use of alumina particles is preferred.

[Capacity Retention Ratio after High-Temperature Storage]

In these test examples, porous heat-resistant layers were formed in which the porosity of the overall porous heat-resistant layer was made about the same and hollow particles of respectively differing average particle diameters and hollownesses were used. Here, hollow particles having average particle diameters of about 0.5 μm, 0.8 μm and 1.0 μm were used. In addition, the hollowness was varied within the range of 0% to 35%. Lithium secondary batteries for testing were built in the same way as for Samples 1 to 8.

Figure 11:
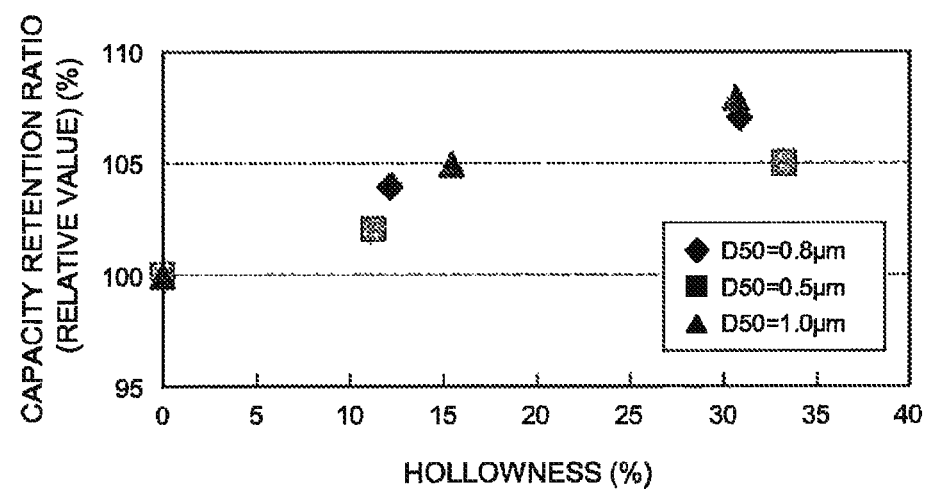
FIG. 11 is a graph showing the relationship between hollowness and capacity retention ratio.

The lithium secondary batteries for testing obtained above were adjusted to a SOC of 100%, following Which they were stored for 30 days in a 60° C. environment. Next, the battery capacity following 30 days of storage at 60° C. was measured, and the ratio of the battery capacity at that time to the initial battery capacity was calculated as the capacity retention ratio. The results are shown in FIG. 11. In FIG. 11, the capacity retention ratios of the respective samples are values relative to a value of 100% for the capacity retention ratio when solid particles (hollowness, 0%) were used; that is, the values expressed as (capacity retention ratio of the respective samples)/(capacity retention ratio of a sample having a hollowness of 0%)×100. It is fair to say that, as this relative value of the capacity retention ratio becomes larger, the battery incurs less deterioration in performance.

As is apparent from FIG. 11, even in cases where the porosity of the overall porous heat-resistant layer is about the same, batteries which use hollow particles maintain a higher capacity retention ratio than batteries which use solid particles (0% hollowness). In hollow particles, because the periphery of the cavity which holds the nonaqueous electrolyte solution is enclosed by a shell, compared with simple gaps between particles, the ability to retain a liquid is greatly increased. Hence, in batteries which use hollow particles, the porous heat resistant layer has a higher liquid retention than in batteries which use solid particles. This presumably enables a battery that stably exhibits a higher performance to be built.

The invention has been described in detail above by way of preferred embodiments and examples, although these descriptions are not intended to be limitative, various modifications and changes to the foregoing embodiments and examples being of course possible. For instance, the type of battery is not limited to the above-described lithium secondary battery, and may be batteries of various composition that include differing electrolyte assembly materials and electrolytes, such as nickel hydrogen batteries, nickel cadmium batteries and electrical double layer capacitors.

So long as use is made of the porous heat-resistant layer containing hollow particles disclosed herein, the shape (exterior shape and size) of the nonaqueous electrolyte secondary battery that is built is not subject to any particular limitation. The battery may be one in which the outer enclosure is a thin sheet-type housing formed of a laminate film or the like, one in which the battery outer case has a cylindrical or rectangular shape, or one having a small button shape.

The above-described embodiments have been illustrated by cases in which the porous heat-resistant layer is formed on the separator surface, although the invention is not limited in this regard. For example, the porous heat-resistant layer may be formed on the surface of the positive electrode active material layer. In such a case, should the separator break, the porous heat-resistant layer can prevent direct contact between the positive electrode sheet and the negative electrode sheet, in addition to which a nonaqueous secondary battery can be built in which the porous heat-resistant layer does not readily peel from the positive electrode active material layer and which thus has a good durability. Moreover, the porous heat-resistant layer is not limited to the positive electrode side, and can also be placed on the negative electrode side (that is, on the surface of the negative electrode active material layer). Of course, it is also possible to place porous heat-resistant layers on both the positive electrode side and the negative electrode side. However, from the standpoint of suppressing heat shrinkage of the separator, as in the above-described embodiment, it is preferable to form the porous heat-resistant layer on the surface of the separator. According to this invention, even in cases where an internal short-circuit has occurred due to the inadvertent addition of foreign matter to the battery interior, peeling of the porous inorganic layer from the separator on account of the energy discharged with the occurrence of the short-circuit is suppressed, making it possible to achieve a high-performance nonaqueous electrolyte secondary battery in which internal short-circuits do not easily spread.

INDUSTRIAL APPLICABILITY

This invention provides a nonaqueous electrolyte secondary battery having excellent high-rate characteristics and a good durability.

Figure 12:
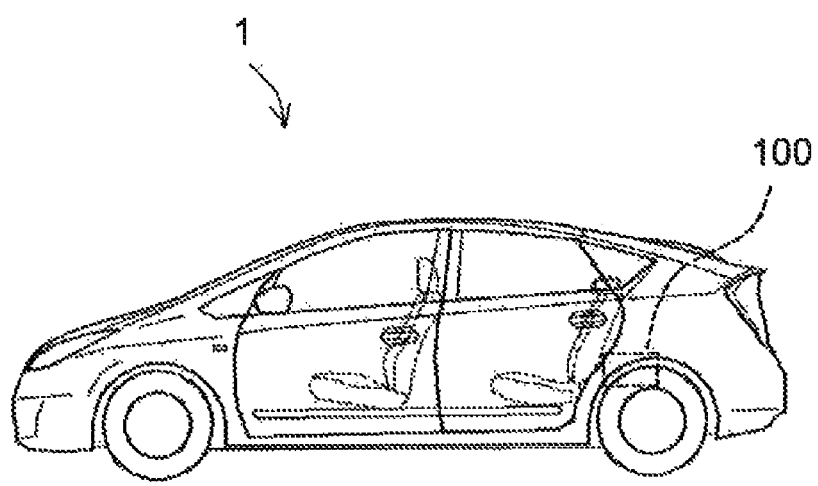
FIG. 12 is a side view schematically showing a vehicle with nonaqueous electrolyte secondary batteries on board.

Any of the nonaqueous electrolyte secondary batteries 100 disclosed herein has a performance suitable as a battery to be installed in a vehicle (a nonaqueous electrolyte secondary battery for use as a power source for driving a vehicle). Therefore, according to this invention, as shown in FIG. 12, there is provided a vehicle 1 having any one of the nonaqueous electrolyte secondary batteries 100 disclosed herein. In particular, a vehicle 1 (e.g., an automobile) having this nonaqueous electrolyte secondary battery 100 as the power source (typically, the power source for a hybrid vehicle or an electric vehicle) is provided.

The invention claimed is:

1. A nonaqueous electrolyte secondary battery comprising a positive electrode, a negative electrode, a separator interposed between the positive electrode and the negative electrode, and a nonaqueous electrolyte solution, the nonaqueous electrolyte secondary battery further comprising a porous heat-resistant layer that is disposed between the separator and at least one electrode from among the positive electrode and the negative electrode, and that is formed on a surface of the separator, wherein the porous heat-resistant layer includes hollow particles consisting of an inorganic material and also includes a binder, and the hollow particles have an average particle diameter of at least 0.50 μm and not more than 0.98 μm; and wherein the hollow particles have a hollowness of from 3% to 30%, where the hollowness of a hollow particle is the ratio of the volume of the hollow portion of the hollow particle to the volume of the hollow particle and is determined by observing a particle cross-section with a scanning electron microscope (SEM), measuring from this cross-sectional SEM image the cross-sectional surface area of the overall particle and the cross-sectional surface area of the hollow portion alone, then carrying out a calculation according to the following formula (1)

$$\text{Hollowness}(\%) = (r^3/R^3) \times 100 \quad (1)$$

where R is the radius of an ideal circle having the same surface area as the cross-sectional surface area of the overall particle being measured, and r is the radius of an ideal circle having the same surface area as the cross-sectional surface area of the hollow portion alone.

2. The nonaqueous electrolyte secondary battery according to claim 1, wherein the porous heat-resistant layer has a porosity of at least 45%, and wherein the porosity of the porous heat-resistant layer is determined from the formula:

$$(1 - W_1 \rho_1 V_1) \times 100$$

where $V_1$ is the apparent volume of the porous heat-resistant layer, $W_1$ is the mass of the layer, and $\rho_1$ is the true density of the porous heat-resistant layer.

3. The nonaqueous electrolyte secondary battery according to claim 1, wherein the hollow particles are formed of at least one type of inorganic compound selected from the group consisting of alumina, magnesia, zirconia, silica, boehmite and titania.

4. The nonaqueous electrolyte secondary battery according to claim 1, wherein the hollow particles are produced by a method comprising:

mixing resin particles into a solution containing an inorganic starting material;

inducing the inorganic starting material to deposit around the resin particles to form a deposited material; and firing the deposited material.

* * * * *